United States Patent [19]

Williams

[11] Patent Number: 4,533,916
[45] Date of Patent: Aug. 6, 1985

[54] MONOPULSED RADAR SYSTEM FOR TRACKING GROUND TARGETS

[75] Inventor: Frederick C. Williams, Topanga, Calif.

[73] Assignee: Hughes Aircraft Company, El Segundo, Calif.

[21] Appl. No.: 756,691

[22] Filed: Aug. 30, 1968

[51] Int. Cl.³ ............................................. G01S 13/68
[52] U.S. Cl. ..................................... 343/7.4; 343/16 M
[58] Field of Search ................... 343/7.4, 7.7, 9, 16 M

[56] References Cited

U.S. PATENT DOCUMENTS 3,706,991 12/1972 Gillmer et al. ...................... 343/7.7
4,155,086 5/1979 Blair ................................... 343/7.4 X Primary Examiner—T. H. Tubbesing
Attorney, Agent, or Firm—L. A. Alkov; L. V. Link, Jr.; A. W. Karambelas

[57] ABSTRACT

This disclosure relates to an improved airborne monopulse radar system used for tracking ground targets. The system includes a null command generator designed to provide an error signal proportional to the angle between a preselected target azimuth and the monopulse antenna difference pattern null azimuth which error signal is unaffected by the presence of moving targets within the area under radar surveillance. The error signal is applied to the monopulse antenna drive servomechanism in order to physically reorient the antenna to have the difference pattern null and the preselected target aligned along the same azimuth.

15 Claims, 12 Drawing Figures

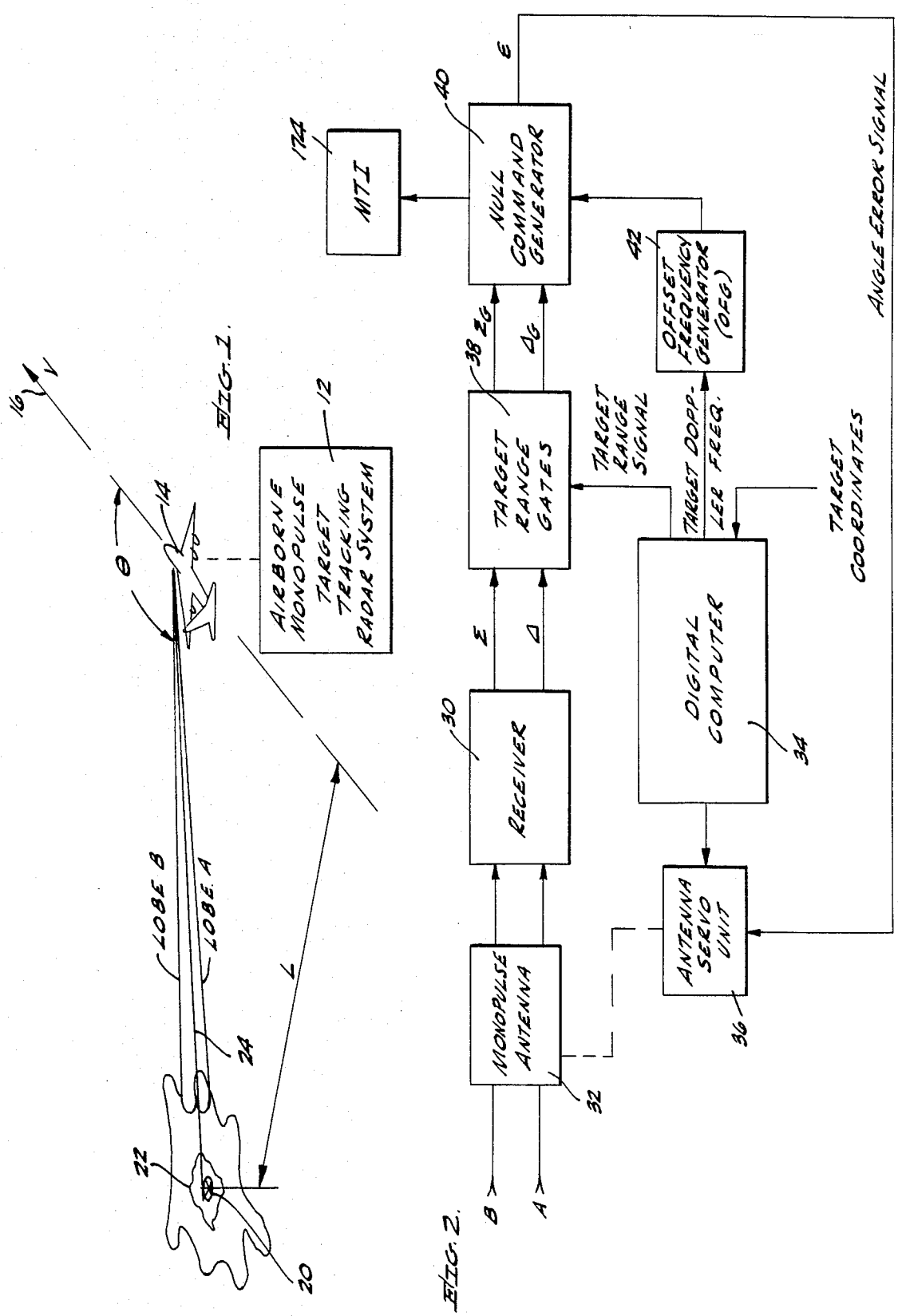

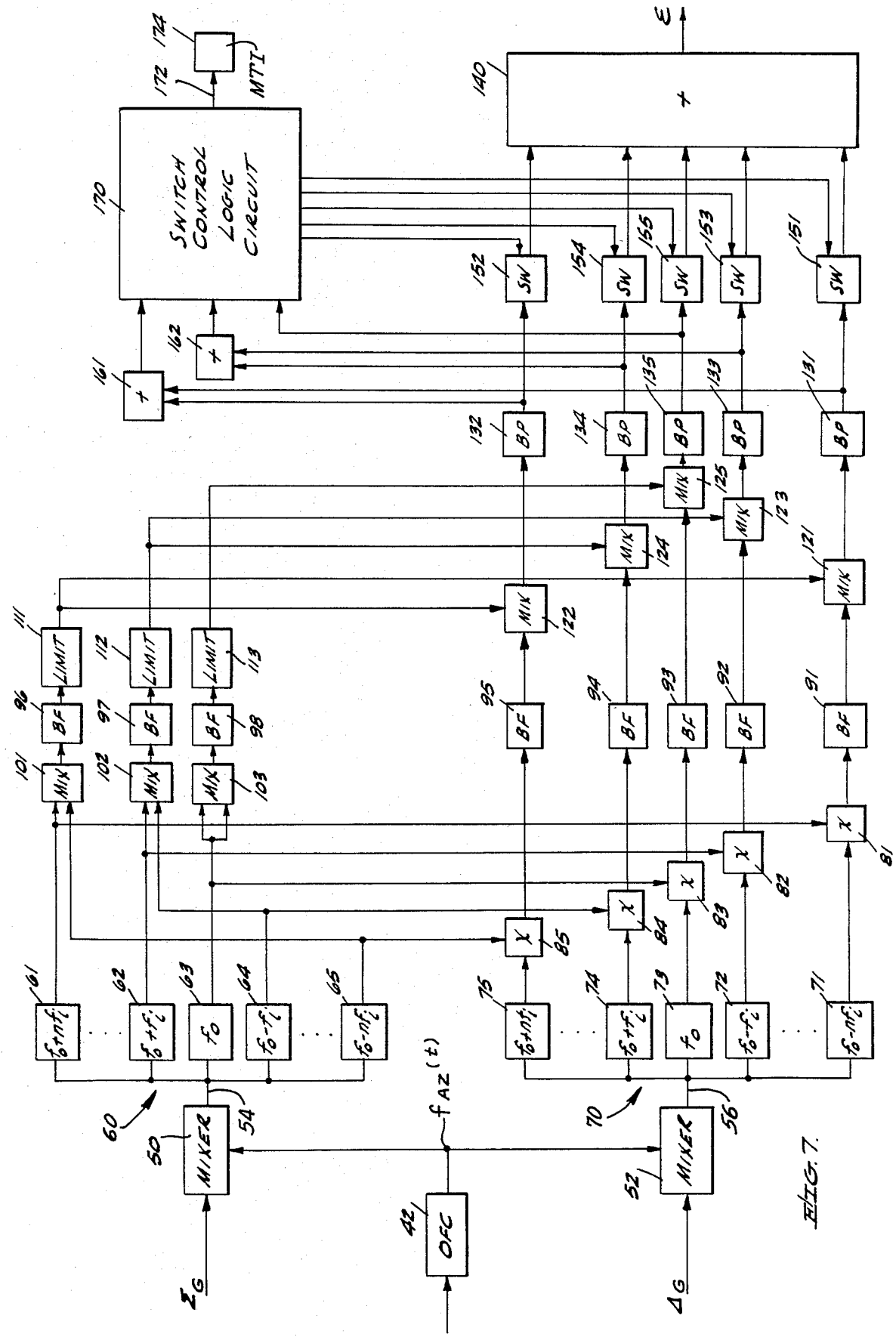

MONOPULSED RADAR SYSTEM FOR TRACKING GROUND TARGETS

BACKGROUND OF THE INVENTION

This invention generally relates to a radar system and more particularly, to improvements in an airborne monopulse radar system used for tracking ground targets.

In the use of conventional prior art monopulse radar systems for tracking ground targets, reliance is generally placed on beam patterns in the sum and difference channels to accurately position or align the antenna to point towards a preselected target. The beam patterns represent received energy which has been reflected by the preselected target. In general, such a target tracking technique has utility only when high target tracking accuracy is not required and/or if the reflected energy vs. noise from the target, i.e., the signal-to-noise ratio, is high. Extreme difficulties arise where the selected target to be tracked has a weak return signal in that the noise in the system, including thermal noise, may nearly obliterate the weak signals from the target thereby making accurate tracking nearly impossible. In order to counteract the effect of the noise, energy reflected from a larger area around the ground target may be accepted to improve the signal-to-noise ratio. However, in that there are wide variations in the back-scatter amplitude relative to azimuth angle, the angle information will be deteriorated and accurate target azimuth angle pointing usually remains nearly impossible. Thus, most airborne monopulse radar systems used for tracking ground targets are limited in their utility by the need for high tracking accuracy and the usual weak return signals produced by ground targets. As such, it is clear that a need exists for improvement in monopulse type radar systems intended to be used in the airborne tracking of ground targets.

SUMMARY OF THE INVENTION

Briefly described, the present invention involves an improved null command generator usable in connection with an airborne monopulse radar system wherein error signals developed by the null command generator are free from inaccuracies caused by moving targets in the preselected target area.

More particularly, the improved null command generator of the present invention includes circuitry for detecting return signals produced by moving targets allowing these signals to be eliminated.

It is therefore an object of the present invention to provide an improved target tracking radar system.

Another object of the present invention is to provide improvements in a monopulse radar system used for the airborne tracking of ground targets.

A further object of the present invention is to provide increased tracking accuracy for monopulse radar systems used for the airborne tracking of ground targets.

A still further object of the present invention is to provide a new relatively simple and highly reliable circuit for controlling the accurate positioning of a monopulse radar antenna with respect to a target being tracked.

Still another object of the present invention is to provide a circuit for producing an error control signal which may be used to accurately position a monopulse antenna to have the difference pattern null aligned with the azimuth of a preselected target.

Another object of the present invention is to provide a circuit for producing accurate error control signals which are free from the undesirable effects produced by the presence of moving targets in a preselected target area.

Yet a further object of the present invention is to provide a device for detecting the presence of moving targets.

DESCRIPTION OF THE DRAWINGS

Other objects and many of the attendant advantages of this invention will be more readily appreciated as the same becomes better understood by reference to the following detailed description which is to be considered in connection with the accompanying drawings in which like reference signals designate like parts throughout the figures thereof and wherein:

FIG. 1 is a diagram useful in illustrating and explaining the use of a radar system in which the present invention is incorporated.

FIG. 2 is a block diagram of a radar system in which the present invention is incorporated.

FIG. 7 is a diagram of one preferred embodiment of the invention.

DESCRIPTION OF THE PREFERRED EMBODIMENTS

Figure 3:
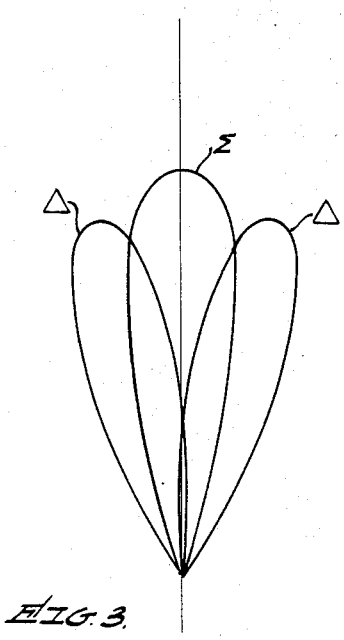
FIG. 3 is a diagram illustrating an exemplary beam pattern of a monopulse antenna.

The novel circuit of the present invention may hereinafter be referred to as a null command generator (NCG) since its primary function is to provide an error signal used to control the position of a monopulse antenna to have the azimuth of the monopulse antenna difference pattern null aligned or in coincidence with the azimuth of a specific target which is to be tracked. Before proceeding to describe the NCG in sufficient detail, an exemplary radar system in which the NCG may be incorporated will be described briefly in conjunction with FIG. 1, to which reference is made herein.

The NCG is assumed to be incorporated in a target tracking monopulse radar system 12 located in an airborne aircraft 14. The aircraft is assumed to be traveling in a direction indicated by the arrow 16, at a safe stand-off distance L, from a target 20 which is assumed to be on the ground. The function of system 12 is to continuously track the target 20 in azimuth as the aircraft flys by. If required, elevation tracking may be provided by other means.

Gross azimuth tracking is provided by the processing of the received signals in the sum and difference channels of the monopulse receiver of system 12. The beam patterns transmitted by the monopulse system 12 are designated in FIG. 1 as lobe A and lobe B. The boresight axis of the monopulse antenna, which may be assumed for the purposes of this disclosure to be in general coincidence with the monopulse difference pattern null, is represented by the line 24.

Since airborne radar systems inherently have limited power due to space limitations, and reflected signals from ground targets, such as the target 20, are generally weak, it follows that the signal-to-noise ratio of a system such as the radar system 12 is low. To compensate for the low signal-to-noise ratio, a relatively large target area is illuminated, that is to say, an area such as that included within the line 22 which encompasses the specific target of interest. Since variations in back-scatter are nearly always present, a likelihood exists that returns from one side of the target area may exceed those from the other side resulting in target pulling. Unless accounted for, such target pulling will produce an error in the proper alignment of the radar antenna with respect to the center of a target. It is to overcome these difficulties as well as others to be later discussed, that the NCG of the present invention is incorporated in the system 12, which is shown in FIG. 2 in further detail.

The system 12 consists of a receiver 30 which receives sum ($\Sigma$) and difference ($\Delta$) signals from a monopulse antenna 32. The circuitry necessary for transmitting energy pulses in the direction of a target has been purposely excluded from FIG. 2 in that such circuitry is well known in the prior art. The digital computer 34 performs several known functions when used in a target tracking radar system. Among these functions are included utilizing the target coordinates and aircraft position as input data to grossly point the monopulse antenna 32, which antenna may be mounted atop a stable platform which is not illustrated, in the direction of a target whose coordinates have been supplied to the computer. The physical positioning of the antenna 32 may be accomplished in a conventional manner well known in the prior art by using an antenna servomechanism 36.

The computer 34, based on target coordinates and aircraft navigational data supplied thereto, computes a range interval which includes the target range. The computer provides a target range interval signal to target range gate 38 such that only the sum and difference signals from receiver 30 which are received from the computed target range interval are supplied to the null command generator (NCG) 40 which constitutes the present invention. The sum and difference signals applied to NCG 40 may thus be designated $\Sigma_G$ and $\Delta_G$ respectively.

The NCG 40 is also supplied with signals having selected frequencies from an offset target doppler frequency generator 42 which hereafter may be referred to, simply, as the offset frequency generator or the OFG.

As previously stated, the basic function of the NCG 40 is to utilize the range gated sum ($\Sigma_G$) and difference ($\Delta_G$) signals and the output of the OFG to derive an error signal which represents the angle between the difference pattern null azimuth and the actual target azimuth. This error signal has a magnitude proportional to the difference between a predetermined doppler frequency corresponding to a target along a specific azimuth, as computed by computer 34, and a doppler frequency corresponding to a target situated along the azimuth of the monopulse antenna difference pattern null. This error signal is applied from the NCG 40 to the servo unit 36 to automatically position the antenna 32 to maintain the difference pattern null azimuth and the target azimuth in coincidence.

A prerequisite understanding of the relationship between the doppler frequency $f_D$ and the azimuth angle $\theta$ is necessary for a complete appreciation of the present invention. Referring once again to FIG. 1, the radar system 12 is assumed to be mounted in the aircraft 14 which is traveling in the direction of the arrow 16 at a velocity v. For transmitted signals having a frequency f and a corresponding wavelength $\lambda$, signals reflected from the ground target 20, which is located along an azimuth at an angle $\theta$ measured from the aircraft direction of travel, will be changed in frequency due to the well known doppler phenomenon by an amount $$f_D = [2v/\lambda] \cos \theta \qquad [1]$$

relative to the transmitted frequency f. This change in frequency, $f_D$, is known as the doppler frequency. In that the velocity v of the aircraft 14 and the wavelength $\lambda$ of the transmitted frequency f can be held constant, it is clear that as the angle $\theta$ varies as a function of time, due to the aircraft moving past the target 20, the resulting amount of change in the frequency of the returned signals, the doppler frequency $f_D$, will likewise vary as a function of time. It follows that each azimuth measured from the aircraft direction of travel, such as the azimuth of the target 20 which is illustrated as being in coincidence with the monopulse antenna boresight axis 24, may be defined in terms of a doppler frequency $f_D$ as well as an angle $\theta$. It is this concept that is used in connection with the present invention.

Before proceeding to describe the structure of NCG 40 in sufficient detail to enable those familiar in the art to practice the invention, it is further helpful to discuss the principles of the present invention in greater detail which may best be done in conjunction with FIGS. 3–6.

Figure 4:
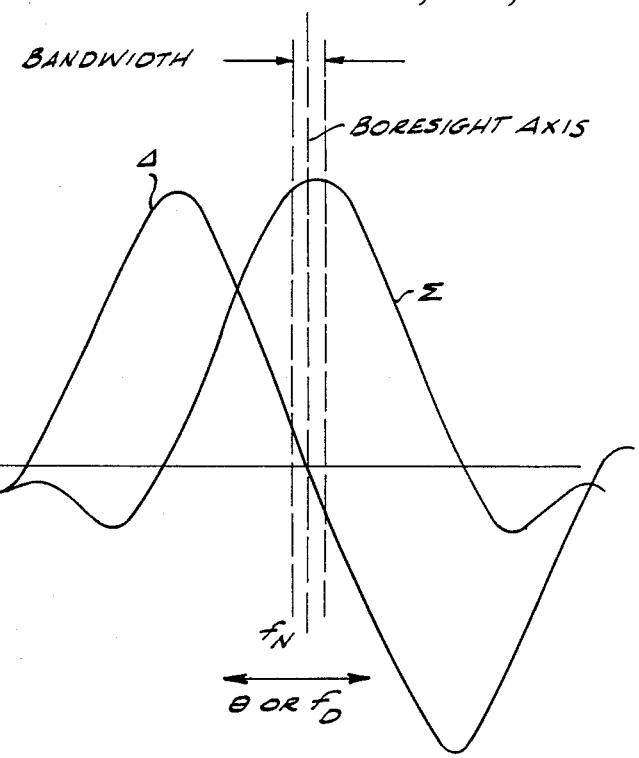
FIG. 4 is a diagram illustrating monopulse sum ($\Sigma$) and difference ($\Delta$) signals.

The sum ($\Sigma$) and difference ($\Delta$) beam patterns of the monopulse antenna 32 correspond generally to the field patterns shown in FIG. 3. As is understood in the monopulse art, the developed sum ($\Sigma$) signal is an even function about the boresight axis with a maximum response on the boresight axis while the difference ($\Delta$) signal is an odd function about the boresight axis with a characteristic null on the boresight axis. This is illustrated in FIG. 4 which is a graphic representation of the sum ($\Sigma$) and difference ($\Delta$) signals as functions of doppler frequency or angular displacement from the boresight axis. In FIG. 4, as well as in FIG. 5, $f_N$ is the doppler frequency corresponding to the azimuth of the monopulse difference pattern null.

Figure 5:
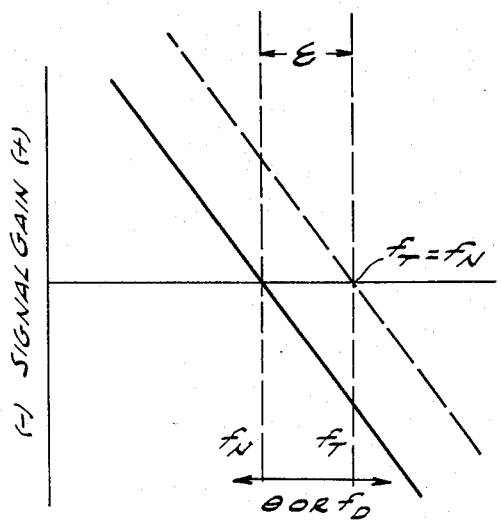
FIG. 5 is a diagram illustrating the null region of a monopulse difference ($\Delta$) signal.
Figure 6:
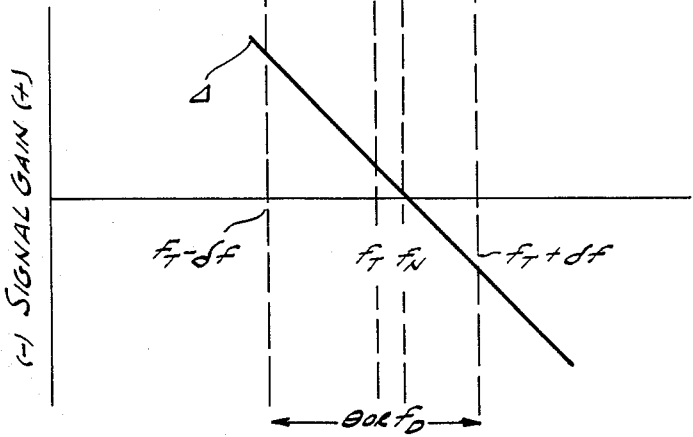
FIG. 6 is a diagram illustrating monopulse sum ($\Sigma$) and difference ($\Delta$) signals for uniformly distributed ground targets.

Referring to FIG. 5, the doppler frequency corresponding to the azimuth of the target being tracked is designated $f_T$. As previously mentioned, the function of the NCG 40 is to provide an error signal which is proportional to the angle between the difference pattern null azimuth and the target azimuth or, otherwise stated, the difference between the doppler frequency $f_N$ corresponding to the difference pattern null azimuth and the doppler frequency $f_T$ corresponding to the target azimuth. This error signal, which is herein designated $\epsilon$ is applied to the monopulse antenna servo unit 36 (FIG. 1) to reposition the antenna 32 to maintain the difference pattern null azimuth and the target azimuth in coincidence. When the antenna 32 is so positioned, the doppler frequency $f_N$ is equal to the doppler frequency $f_T$ such that $\epsilon=0$, i.e., no error exists as is illustrated in FIG. 5 by the difference pattern shown as a dashed dotted line. The amount of error $\epsilon$ is proportional to the sum of the cross products of the gains of the sum and difference signals taken at incremental azimuth angles away from the target. This error signal $\epsilon$ may be generally expressed in equation form as:

$$\epsilon = S(\delta f)D(-\delta f) + S(-\delta f)D(\delta f) \quad [2]$$

where $\delta f$ and $-\delta f$ are incremental doppler frequencies relating to the incremental angles $\delta\theta$ and $-\delta\theta$ which respectively correspond to off-target azimuths at an equal angular distance from and on opposite sides of the target azimuth. S and D represent the gains of the sum ($\Sigma$) and difference ($\Delta$) signals at these off-target azimuths. These relationships are illustrated in FIG. 6. It is to be noted that both FIGS. 5 and 6 are expanded views of the area between the dotted lines shown in FIG. 4.

For weak return signals, such as those of ground targets, the effects of back-scatter, which has a random amplitude at varying azimuths, must be considered. The back-scatter amplitude may be represented by the back-scatter coefficient $\eta(\delta f)$. Equation [2] may then be more specifically written as:

$$\epsilon = \eta(\delta f)S(\delta f)\eta(-\delta f)D(-\delta f) + \eta(-\delta f)S(-\delta f)\eta(\delta f)D(\delta f) \quad [3]$$

$$= \eta(\delta f)\eta(-\delta f)[S(\delta f)D(-\delta f) + S(-\delta f)D(\delta f)]$$

In that the sum ($\Sigma$) signal gain S can be considered constant over a small angle in the region of the boresight axis or center of the sum pattern, the sum signal gains relating to incremental azimuth angles on opposite sides of a target azimuth in the same region are also equal, i.e., $S(-\delta f)=S(\delta f)$. Equation [3] can then be written:

$$\epsilon = \eta(\delta f)\eta(-\delta f)S(\delta f)[D(-\delta f) = D(\delta f)] \quad [4]$$

As well known in the art, the effect of thermal noise in the received signals on the antenna pointing error signal $\epsilon$ can be reduced by taking a large number of independent estimators of $\epsilon$, the signal-to-noise ratio improvement being approximately proportional to the square root of the number of estimators. To this end, the error signal expressed by equation [4] can be considered an estimator of the error signal $\epsilon$ where the error is calculated for a plurality of incremental angles on opposite sides of a specific target and the many independent estimators of $\epsilon$ are summed such that the error $\epsilon = \Sigma_o^k \epsilon(\delta f_k)$ where k is the number of estimators of $\epsilon$ that are calculated.

The magnitude of the error signal $\epsilon$ thus goes to zero when $D(-\delta f) = -D(\delta f)$. This condition will occur when $f_T = f_N$ since the gain of the difference signal is characteristically of equal but opposite magnitude on opposite sides of the null.

Signals arriving at the monopulse antenna 32 from an off-target direction $f_T + \delta f$, are now considered. As previously mentioned, these signals will include the effects of the random back-scatter amplitude. The phase of these received signals will also be a random quantity which can be represented by $\Phi(\delta f)$. These signals when applied to the monopulse receiver 30 over the sum and difference channels are proportional to the product of $\eta(\delta f)$ and $\Phi(\delta f)$ multiplied by the sum ($\Sigma$) signal gain $S(\delta f)$ and the difference ($\Delta$) signal gain $D(\delta f)$, respectively. The range gated sum ($\Sigma_G$) and difference ($\Delta_G$) signals which are applied to the NCG 40 can thus be expressed as:

$$\tau_G(\delta f) = \eta(\delta f)S(\delta f)\cos\{2\pi[f_T(t)+\delta f]t + \Phi(\delta f)\} \quad [5]$$

and $$\Delta_G(\delta f) = \eta(\delta f)D(\delta f)\cos\{2\pi[f_T(t)+\delta f]t + \Phi(\delta f)\} \quad [6]$$

Referring now to FIG. 7, the OFG 42 generates a reference frequency which may be defined as:

$$f_{AZ}(t) = f_T(t) - f_o \quad [7]$$

where $f_T$ is the doppler frequency of a designated target being tracked by the airborne radar system 12 (FIG. 1) and $f_o$ is a preselected offset frequency which is used as the center frequency of a sum channel filter array 60 and a difference channel filter array 70.

The reference frequency, $f_{AZ}(t)$ is applied to a sum channel mixer 50 and a difference channel mixer 52 which respectively serve to mix the range gated sum ($\Sigma_G$) and difference ($\Delta_G$) signals with the reference frequency $f_{AZ}(t)$. After mixing in the mixers 50 and 52, the frequency portion of equations [5] and [6] becomes:

$$\{2\pi[f_T(t) + \delta f - f_T(t) + f_o]t + \psi(\delta f)\} = \{2\pi[f_o + \delta f]t + \psi(\delta f)\} \quad [8]$$

and the signals appearing at the output leads 54 and 56 of the respective mixers 50 and 52 may be expressed as:

$$\Sigma_G'(\delta f) = \eta(\delta f)S(\delta f)\cos\{2\pi[f_o+\delta f]t + \Phi(\delta f)\} \quad [9]$$

and $$\Delta_G'(\delta f) = \eta(\delta f)D(\delta f)\cos\{2\pi[f_o+\delta f]t + \Phi(\delta f)\}. \quad [10]$$

These signals, $\Sigma_G'$ and $\Delta_G'$, are respectively applied to the sum channel filter array 60 and the difference channel filter array 70.

The filter arrays 60 and 70 are structurally identical and have the previously mentioned offset frequency, $f_o$, as the center frequency. Each array has an equal number of side filters, such as the filters 61, 62, 64 and 65, above and below the center filters 63 and 73, the bandwidth and spacing between adjacent filters being, for example, equal to a predetermined incremental frequency such as $f_i$. The number of filters in each array would thus be $2n+1$ where n is the number of side filters both above and below the center filters 63 or 73 which have a resonant frequency of $f_0$. The side filters above the center filters 63 and 73 would have increasing frequencies ranging from $f_o+f_i$ to $f_o+nf_i$ and the filters below the center filter would have decreasing frequencies ranging from $f_o-f_i$ to $f_o-nf_i$. In the arrangement of the present invention, the amplitude and phase shift characteristics of each filter in the sum channel filter array 60 must be matched with a filter in the difference channel filter array 70 which has a resonant frequency that is removed from the center frequency $f_o$ by an equal but opposite increment. For example, the sum channel filter 61 which has a frequency of $f_o+nf_i$ must be matched with the difference channel filter 71 having a frequency of $f_o-nf_i$. Similarly, the characteristics of the filter 62 must match those of the filter 72, the filter 64 must match those of the filter 74, and the filter 65 must match those of the filter 75. Following the above described scheme, the characteristics of the center filters 63 and 73 must likewise be matched.

The filters 61–65 and 71–75 may be of any appropriate conventional type such as, for example, the narrow band type having two precision tuning forks and associated buffer amplifiers. In that these filters are well-known in the art, they will not be explained further herein.

The offset frequency $f_o$ is the resonant frequency of the center filters 63 and 73. As previdusly explained, the mixing operations of mixers 50 and 52 serve to offset the doppler frequency of all targets in the general region of the selected target by a frequency increment $f_T(t)-f_o$ such that all targets in the region of the selected target having the doppler frequency $f_T(t)$ are represented by predetermined doppler frequencies above and below $f_o$. The filter arrays 60 and 70, each including an appropriate number of individual filters having a resonant frequency ranging from $f_o-nf_i$ through $f_o+nf_i$, is intended to accommodate the doppler frequency spectrum for the target area. As previously indicated the error signal $\epsilon$ is proportional to the sum of the cross-products of the gains of the sum and difference signals taken at incremental azimuth angles away from the target (see equation [3]). To accomplish this cross multiplication, the outputs of the filters 61–65 included in the subchannel filter array 60 are respectively applied as a first input to the multipliers 81–85. The outputs of filters 71–75 of the difference channel filter array 70 are respectively applied as a second input to the multipliers 81–85. The output of each of the multipliers 81–85 would thus be the cross-product of the sum signal gain (S) and the difference signal gain (D) taken at equal but opposite increments away from the center frequency $f_o$, in effect, at equal but opposite increments away from the doppler frequency corresponding to a specific target ($f_T$). For example, the output of the multiplier 81 would have the amplitude $\eta(\delta f_n)S(\delta f_n)\eta(-\delta f_n)D(-\delta f_n)$. The multipliers 81–85 may be of any conventional type well-known in the prior art such as the "quarter square" or "Hall effect" type, which will preserve the amplitude information of signals applied thereto.

The outputs of the multipliers 81–85 are respectively applied to a plurality of band pass filters 91–95 for the purpose of eliminating the low frequency terms resulting from the multiplication process.

In order to provide a phase reference for the output signals of the multipliers 81–85, the sum channel filters having resonant frequencies which are equally spaced from the center frequency $f_o$ are mixed. Thus, the outputs of filters 61 and 65 are applied to a mixer 101 and the outputs of the filters 62 and 64 are applied to a mixer 102. In that the center filter 63 does not have a counterpart, a phase reference signal is produced by applying the same signal to both input leads of a mixer 103, in effect, mixing the signal with itself. The outputs of the mixers 101–103 are, similar to the outputs of the multipliers 81–85, band passed to eliminate the low-frequency terms resulting from the mixing process. To this end, the outputs of the mixers 101–103 are respectively applied to the bandpass filters 96–98.

The output of these bandpass filters 96–98 are respectively applied to the limiters 111–113 in order to limit the amplitude of the respective signals and thereby remove the amplitude information while preserving the phase reference information.

In order to provide a phase reference for the outputs of the multipliers 81–85, the output of the limiter 111 is mixed with the band passed outputs of the multipliers 81 and 85 in the mixers 121 and 122, respectively.

The output of the limiter 112 is similarly mixed with the band passed outputs of the multipliers 82 and 84 in the mixers 123 and 124, respectively, and the output of the limiter 113 is mixed with the band passed output of the multiplier 83 in the mixer 125. Without this phase referencing, the direction of difference pattern null azimuth relative to the specific target azimuth would not be positively ascertainable in that the difference null azimuth could be on either side of the target azimuth. The phase reference signals thus allow the direction of the null azimuth relative to the target azimuth to be determined, the error signal $\epsilon$ ultimately being a bipolar dc signal.

The outputs of the mixers 121–125 are subsequently applied to the bandpass filters 131–135, respectively, for the purpose of eliminating the high frequency terms resulting from the mixing process accomplished by the mixers 121–125.

The discussion of the invention to this point has emphasized the derivation of the magnitude of the error signal $\epsilon$ without bearing on the importance of the phase components of the signals received by the antenna 32. As just previously mentioned, it is important to consider these phase components to allow the determination of the direction in which the antenna must be moved to have the difference pattern null azimuth in coincidence with the target azimuth.

From the previous discussion, it can be seen that the band passed output of the multiplier 81, for example, can be expressed as:

$$\Sigma_{G'}(\delta f_n) \Delta_{G'}(-\delta f_n) = \quad [11]$$

$$\eta(\delta f_n)\,\eta(-\delta f_n)\,S(\delta f_n)\,D(-\delta f_n)\,\cos[4\pi f_o t + \psi(\delta f_n) + \psi(-\delta f_n)]$$

and the output of limiter 111 can be expressed as:

$$\Sigma_{G'}(\delta f_n) \Sigma_{G'}(-\delta f_n) = \cos[4\pi f_o t + \psi(\delta f_n) + \psi(-\delta f_n)] \quad [12]$$

where $\delta f_n$ is the incremental doppler frequency for the azimuth having a transposed doppler frequency of $f_o+nf_i$ and which is offset from the target azimuth by an incremental angle 67 $\theta_n$ and where $-\delta f_n$ is the incremental doppler frequency for the azimuth having a transposed doppler frequency of $f_o-nf_i$ and which is offset from the target azimuth by an incremental angle $-\delta\theta_n$. The output of the mixer 121 after removal of the high frequency term by the bandpass filter 131 is a dc term which may be expressed as:

$$\eta(\delta f_n)\eta(-\delta f_n)S(\delta f_n)D(-\delta f_n). \quad [13]$$

The influence of the random phase angles $\Phi(\delta f_n)$ and $\Phi(-\delta f_n)$ is thereby eliminated and since all terms in expression [13] are always positive except for the difference pattern gain term $D(-\delta f_n)$ which will be positive on one side of the difference pattern null and negative on the other side, the direction in which the antenna must be moved is known.

Referring once again to FIG. 7, the outputs of the respective bandpass filters 131–135 are applied through the selectively controlled, normally closed switches 151-155 to the summer 140 which serves to algebraically sum the filtered outputs of the mixers 121-125 and thereby produce the error signal $\epsilon$ which is ultimately applied to the antenna servo unit 36 (FIG. 2). The output of the summer 140, which is a summation of a plurality of estimators of $\epsilon$ (see equation [4]) produced by summing the outputs of bandpass filters 131-135 in pairs, i.e., filters 131 and 132, may be thus expressed as:

$$\epsilon = \Sigma_o{}^n\ \eta(\delta f_n)\eta(-\delta f_n)S(\delta f_n)[D(\delta f_n)+D(-\delta f_n)] \quad [14]$$

Figure 8A:
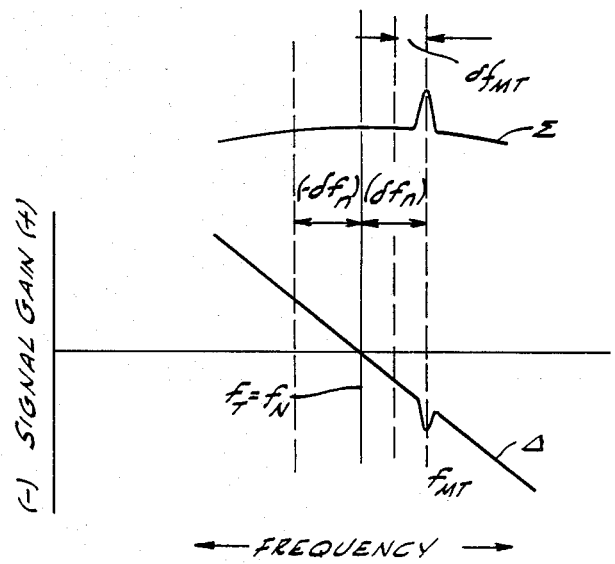
FIGS. 8a and 8b are diagrams illustrating monopulse sum ($\Sigma$) and difference ($\Delta$) signals for uniformly distributed ground targets plus a moving target plotted as a function of doppler frequency and azimuth angle, respectively.
Figure 8B:
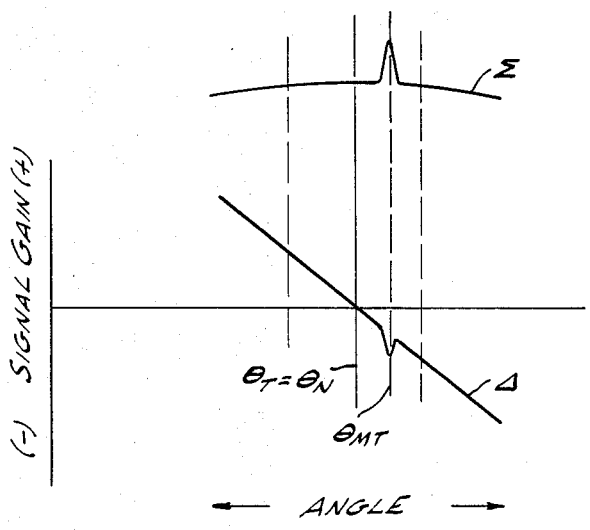

The NCG 40 described in detail to this point will thus provide an error signal $\epsilon$ which will serve to continually control a monopulse antenna such that the difference pattern null azimuth will be in coincidence with the azimuth of a specific ground target. As long as the NCG 40 is operating in the guidance loop, the error signal $\epsilon$ will be zero. In that this error signal $\delta$ is developed by operating on the doppler frequencies received, however, inaccuracies or pointing errors may be introduced by the presence of moving targets in the area under surveillance whose range and doppler frequency falls within the band of frequencies accepted by the NCG 40. This can be seen by reference to FIGS. 8a and 8b which illustrate exemplary plots of the sum and difference signal amplitudes for uniformly distributed ground targets plus a moving target as a function of frequency and angle, respectively, where the ground target azimuth is in coincidence with the difference pattern null azimuth; i.e., $f_T = f_N$ and backscatter from the ground target is assumed constant. The portion of the plots, of the respective sum and difference patterns, due to the stationary ground targets are identical. However, when a moving target having a radial component of velocity is present, a comparison of FIGS. 8a and 8b illustrates that the position of the portion of the plot due to the moving target, when plotted as a function of doppler frequency as in FIG. 8a instead of angle as in FIG. 8b, is shifted. This shift is due to the doppler frequency $f_{MT}$, of the moving target which may be expressed as:

$$\delta f_{MT} = 2v_{rMT}/\lambda \quad [15]$$

where $v_{rMT}$ is the radial velocity of the moving target relative to the ground.

The amplitudes of the respective sum ($\Sigma$) and difference ($\Delta$) channel for the filter 61 corresponding to $f_T + \delta f_n$ (in which the moving target signal appears) and the opposite filter 65 corresponding to $f_T - \delta f_n$ as shown in FIG. 8a are now considered. Taking into account the effects of back-scatter although not illustrated, the amplitude of the signal out of the filter 61 corresponding to $f_T + \delta f_n$ may be expressed as:

$$\Sigma_R = \eta(\delta f_n)S(\delta f_n) + \sigma_{MT}S(\delta f_n - \delta f_{MT}) \quad [16]$$

where $\sigma_{MT}$ represents the amplitude of the moving target signal and $S(\delta f_n - \delta f_{MT})$ represents the gain of the sum ($\Sigma$) pattern in the direction of the moving target. The amplitude of the sum ($\Sigma$) signal out of the filter 65 corresponding to $f_T - \delta f_n$ is wholly due to the stationary ground target and can be expressed as:

$$\Sigma_L = \eta(-\delta f_n)S(-\delta f_n). \quad [17]$$

The amplitude of the difference ($\Delta$) signal out of the filter 75 corresponding to $f_T + \delta f_n$ can be expressed as:

$$\Delta_R = \eta(\delta f_n)D(\delta f_n) + \sigma_{MT}D(\delta f_n - \delta f_{MT}) \quad [18]$$

where $D(\delta f_n - \delta f_{MT})$ represents the gain of the difference ($\Delta$) pattern in the direction ($\theta_{MT}$) of the moving target. The amplitude of the difference ($\Delta$) signal out of the filter 71 corresponding to $f_T - \delta f_n$ can be expressed as:

$$\Delta_L = \eta(-\delta f_n)D(-\delta f_n). \quad [19]$$

Equation [3] can then be expressed as:

$$\epsilon = \Sigma_R \Delta_L + \Sigma_L \Delta_R \quad [20]$$

which becomes:

$$\epsilon = \eta(\delta f_n)\ S(\delta f_n)\ \eta(-\delta f_n)\ D(-\delta f_n)\ + \quad [21]$$
$$\eta(-\delta f_n)\ D(-\delta f_n)\ \sigma_{MT}S(\delta f_n - \delta f_{MT})\ +$$
$$\eta(-\delta f_n)\ S(-\delta f_n)\ \eta(\delta f_n)\ D(\delta f_n)\ +$$
$$\eta(-\delta f_n)\ S(-\delta f_n)\ \sigma_{MT}D(\delta f_n - \delta f_{MT})$$

Factoring out the common terms and combining, equation [21] can be written as:

$$\epsilon = \eta(\delta f_n)\ \eta(-\delta f_n)\ S(\delta f_n)\ [D(-\delta f_n)\ +\ D(\delta f_n)]\ + \quad [22]$$
$$\eta(-\delta f_n)\ \sigma_{MT}[D(-\delta f_n)\ S(\delta f_n - \delta f_{MT})\ +\ S(-\delta f_n)\ D(\delta f_n - \delta f_{MT})]$$

Since $f_T = f_N$, the gains of the difference pattern due to the stationary ground target are symmetrical on opposite sides of the null and $D(-\delta f_n) = -D(\delta f_n)$, as previously discussed in connection with equation [4]. Equation [22] can then be expressed as:

$$\epsilon = \eta(-\delta f_n)\ \sigma_{MT}[D(-\delta f_n)\ S(\delta f_n - \delta f_{MT})\ + \quad [23]$$
$$S(-\delta f_n)\ D(\delta f_n - \delta f_{MT})]$$

which indicates that when the antenna is pointing at the stationary ground target, i.e., $f_T = f_N$, in the presence of a moving target, the error signal will not be zero as expected. As such an antenna pointing error will exist.

Figure 9A:
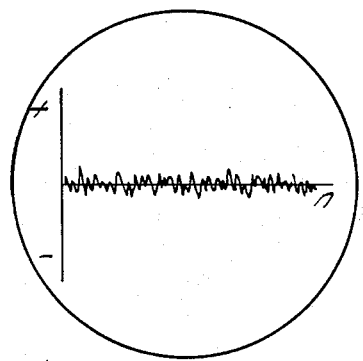
FIGS. 9a, 9b and 9c are diagrams illustrating cathode ray tube displays which are useful in explaining the invention.
Figure 9B:
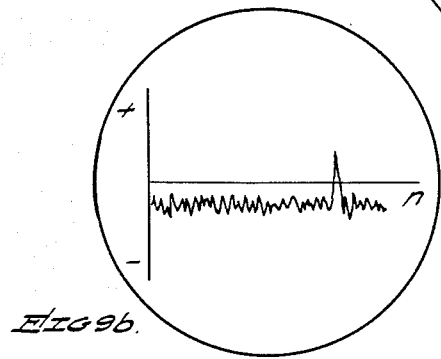

FIG. 9a illustrates a plot of the estimators of the error signal $\epsilon$ if sequentially sampled where the error signal $\epsilon$ is zero and no moving targets are present. Since when the NCG 40 is operating in the guidance loop the error $\epsilon$ will equal zero, the estimators when summed will always equal zero and it can be expected that approximately one-half ($\frac{1}{2}$) of the estimators of $\epsilon$ will be positive and the other one-half ($\frac{1}{2}$) will be negative. This is supported by statistical theory which indicates that the number of estimators having either sign will in this case be $n \pm 3\sqrt{n+1}$ with a confidence of 99.9% where n, as previously mentioned, is the number of side filters on each side of the center filters 63 or 73 (see FIG. 7). Assuming that the NCG 40 is operating in the loop, i.e., generating a signal used to correct the position of the antenna 32 where a moving target having a range and doppler frequency within the acceptance band of the NCG 40 is present, $\epsilon$ will remain zero, however a small number or minority, for example, 1 to 3, of the estimators of $\epsilon$ will be of one sign or polarity, i.e., positive or negative, while the majority of the estimators of $\epsilon$ will be of the opposite sign or polarity. This is shown in FIG. 9b. The fact that $\epsilon$ remains zero in the presence of moving targets means that an antenna pointing bias exists, i.e., the antenna is pointing in the wrong direction.

Figure 9C:
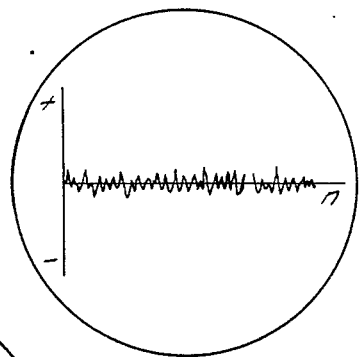

In order to eliminate this antenna pointing bias due to the moving target, the unusually large pulse shown in FIG. 9b, which is due to the moving target, must be removed as illustrated in FIG. 9c. This results in the antenna pointing being free from the bias caused by the moving target. Otherwise stated, if the estimator of $\epsilon$ which contains moving target information can be identified and excluded, i.e., not applied to the summer 140, the ultimate error signal will be substantially accurate and the antenna will be pointing at the specific ground target. Note also that this identification provides a simple means of recognizing the presence of a moving target.

Referring once again to FIG. 7, the estimators of the error signal $\epsilon$ are formed by the summers 161 and 162. The inputs to these summers are pairs of the band passed outputs of mixers 121–125 which correspond to azimuths at equal but opposite angular distances from the target azimuth. For example, the outputs of the filters 131 and 132 are applied to the summer 161 and the outputs of the filters 133 and 134 are applied to the summer 162. The output of the filter 135 corresponds to the target azimuth (or target doppler frequency as previously explained) and a summation of that signal with any other signal is therefore unnecessary.

The summers 161 and 162, similar to the summers 140, serve to algebraically sum the inputs applied thereto. Any of the conventional summing circuits well known in the art which will serve this function may be used as the summers 161, 162 and 140. In that the particular circuit design of the arithmetic units included in the system are not a part of the present invention, no further discussion of these particular circuit designs is included herein.

The estimators of $\epsilon$ provided by the summers 161 and 162 may be applied along with the output of filter 135 to a switch control logic circuit 170. The logic circuit 170, which may be a special purpose computer or any other circuit available in the prior art, serves to sample the input signal applied thereto and detect which inputs are positive and which inputs are negative. As explained in conjunction with FIG. 9b, when a moving target is the source of an inaccuracy in the error signal $\epsilon$, a minority of the estimators of $\epsilon$ will be of one sign or polarity while the vast majority of these estimators of $\epsilon$ will be of the opposite sign or polarity. Thus if a minority of the estimators of $\epsilon$ are of one sign while the vast majority is of the opposite sign, the switch control logic circuit 170 will generate control signals which serve to open the particular switches (among the switches 151–155) which correspond to the particular outputs of the filters 131–135 which produced the minority estimators of $\epsilon$. For example, if the estimator provided by the summer 162 has the sign of the minority, corresponding to the unusually large pulse illustrated in FIG. 8b, the logic circuit 170 will cause switches 153 and 154 to be opened thereby eliminating the possible pointing error. It is to be noted that the same control signals developed by the logic circuit 170 to control the switches may be applied to any conventional indicator device 174, such as a light or buzzer, over the lead 172 to provide an indication that a moving target is present.

For example, if the present invention included four summers corresponding to the summers 161 and 162, then an exemplary logic circuit 170 could include four threshold circuits to detect the polarity of the individual signals developed by the summers. Four AND gates, one for each threshold circuit, could then be provided to detect the condition where the polarity of the signals developed by the four threshold circuits are three positive signals and one negative signal. All of the threshold output singals would be applied to each AND gate, one of which is applied through an inverter. For this condition the two appropriate switches corresponding to the negative threshold output as previously discussed, would be opened. For the opposite polarity condition, NAND gates could be used to receive the threshold circuit signals, an inverter being included in the one signal to be detected as positive. Because both the AND gate and NAND gate output signals are used to cause the appropriate switches to be opened, these gate outputs can be applied to an OR gate, the OR gate signal being used to control the switches. Additional gates and connections to the switches are, of course, provided for the ordinary case where many more than four summers corresponding to the summers 161 and 162 are included in the system.

The functions of logic circuit 170 may be performed by a human operator wherein the estimators of $\epsilon$ are stored and commutated out to a separate cathode ray tube display in a conventional manner to form, for example, an A scope display as illustrated in FIGS. 9a, 9b and 9c. The operator upon observing the large pulse illustrated in FIG. 9b, would then manually open the appropriate switches among the switches 151–155 to keep a possible antenna pointing error from resulting.

It is to be understood that while the sum and difference channel filter arrays 60 and 70 have been illustrated as having only a limited number of individual filters 61–65 and 71–75, each filter array may have as many individual filters as optimally desirable. As noted earlier, the greater the number of estimators of $\epsilon$ the greater the accuracy of the error signal $\epsilon$ produced by the summer 140. Thus, for example, if the filter arrays 60 or 70 each have forty-one filters, i.e., $2n+1$ where $n=20$, then there will be 21, i.e., $n+1$, estimators of error $\epsilon$ generated by the required 20 summers similar to the summers 161 and 162 in addition to the band passed output of the mixer (such as the mixer 135) corresponding to the target azimuth which output is itself an estimator of $\epsilon$.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A monopulse radar receiving system comprising:
   receiving means including an antenna, and a receiver for providing sum and difference signals respectively having the characteristic sum pattern maximum and difference pattern null amplitudes on a common azimuth and representing energy reflected from a stationary target area under radar surveillance;
   means for providing a target doppler frequency signal representing the azimuth of said target area; and
   error signal generating means responsive to said sum, difference and target doppler frequency signals for producing error signals representative of the direction and magnitude of the positional difference between the difference pattern null azimuth and the target area azimuth, said error signal generating means including means for compensating for antenna pointing errors produced by signals reflected from moving objects in the target area.

2. The monopulse radar receiving system defined by claim 1 wherein said error signal generating means includes means for providing error signals having an amplitude and polarity which are respectively representative of the magnitude and direction of the positional difference between said difference pattern null azimuth and said target azimuth relative to said target azimuth.

3. The monopulse radar receiving system defined by claim 1 wherein said means for compensating for antenna pointing errors produced by signals reflected from moving objects in the target area comprises:

first means for producing signals representing estimators of said positional difference between the difference pattern null azimuth and the target area azimuth;

second means operatively coupled to said first means for detecting those signals representing estimators of said positional difference that are attributable to moving objects in said target area; and third means responsive to output signals from said second means for eliminating said signals representing estimators of said positional difference that are attributable to moving objects in said target area.

4. The monopulse radar receiving system defined by claim 1 wherein the system further comprises indicator means for providing an indication of the presence of moving targets, said indicator means being operatively coupled to said error signal generating means.

5. The monopulse radar receiving system defined by claim 3 wherein said first means comprises a plurality of summers each having as inputs a pair of signals representing the cross-product of the amplitude of said sum and difference signals at points on opposite sides of and at equal distances from the target azimuth.

6. The monopulse radar system defined by claim 3 wherein said second means comprises a logic circuit which serves to detect the polarity of the input signals applied thereto and apply control signals to said third means when a vast majority of said input signals are of one polarity in order to eliminate the minority of signals having the opposite polarity.

7. The monopulse radar system defined by claim 3 wherein said third means comprises a plurality of normally closed switches which are opened in response to control signals from said second means whereby signals representing estimators of said positional difference that are attributable to moving objects in said target area are eliminated.

8. The monopulse radar receiving system defined by claim 3 wherein said system further comprises means operatively coupled to said second means for providing an indication that a moving target is present.

9. The monopulse radar system defined by claim 6 wherein said system further comprises means responsive to the said control signals for providing an indication that a moving target is present.

10. In a target tracking monopulse radar system aboard an airborne craft, the system including an antenna, a receiver for providing sum and difference signals respectively having the characteristic sum pattern maximum and difference pattern null amplitudes on a common azimuth which are a function of signal energy reflected from a stationary target area in a selected range interval from said airborne craft, and a computer for computing a target doppler frequency signal which represents the azimuth of said target area relative to the direction of movement of said airborne craft, the improvement comprising error signal generating means responsive to said sum, difference and target doppler frequency signals for producing error signals having an amplitude and polarity which are respectively representative of the magnitude and direction of the difference in position between said difference pattern null azimuth and said target azimuth relative to said target azimuth, said error signal generating means including means for compensating for antenna pointing errors produced by signals reflected from moving objects in the region of said stationary target area.

11. The system defined by claim 10 wherein said means for compensating for antenna pointing errors produced by signals reflected from moving objects in the target area comprises:

first means for producing signals representing estimators of said difference in position between the difference pattern null azimuth and the target area azimuth;

second means for detecting those signals produced by said first means which represent estimators of said difference in position that are attributable to moving objects in the region of said stationary target area; and third means responsive to said second means for eliminating said signals representing estimators of said difference in position that are attributable to said moving objects in the region of said stationary target area.

12. The system defined by claim 11 wherein said first means comprises a plurality of summers each being responsive to a pair of signals representing the cross-product of the amplitudes of said sum and difference signals taken at points an equal distance from but on opposite sides of said target azimuth.

13. The system defined by claim 11 wherein said second means comprises a control circuit for detecting the polarity of said signals representing estimators of the difference in position between the difference pattern null azimuth and the target area azimuth developed by said first means and for controlling said third means in order to eliminate those estimators of said difference in position having a polarity which is opposite to the polarity of a vast majority of said estimators of said difference in position.

14. The system defined by claim 11 wherein said third means comprises a plurality of normally closed switches which are selectively opened in response to control signals provided by said second means.

15. The system defined by claim 11 wherein a further improvement comprises means operatively coupled to said second means for indicating the presence of moving targets.

* * * * *